United States Patent
Butz

(10) Patent No.: US 6,692,400 B2
(45) Date of Patent: Feb. 17, 2004

(54) MULTI-SPEED GEAR HUB SHIFTABLE UNDER LOAD

(75) Inventor: Hans Butz, Schwebheim (DE)

(73) Assignee: SRAM Deutschland GmbH (DE)

( * ) Notice: Subject to any disclaimer, the term of this patent is extended or adjusted under 35 U.S.C. 154(b) by 0 days.

(21) Appl. No.: 10/064,474

(22) Filed: Jul. 17, 2002

(65) Prior Publication Data
US 2003/0017905 A1 Jan. 23, 2003

(30) Foreign Application Priority Data
Jul. 17, 2001 (DE) .......................... 101 34 842

(51) Int. Cl.[7] ................................. F16H 3/44
(52) U.S. Cl. ....................... 475/296; 475/298
(58) Field of Search .................. 475/296, 297, 475/298, 286, 287, 290, 291, 292, 317–319, 323–325, 901

(56) References Cited

U.S. PATENT DOCUMENTS

| | | | |
|---|---|---|---|
| 3,809,195 A | * 5/1974 | Schulz et al. | 192/217.4 |
| 3,878,737 A | * 4/1975 | Schulz | 475/294 |
| 4,276,973 A | 7/1981 | Fukui | 192/47 |
| 4,628,769 A | 12/1986 | Nagano | 74/750 |
| 4,721,013 A | * 1/1988 | Steuer et al. | 478/289 |
| 5,096,037 A | * 3/1992 | Knoess et al. | 192/108 |
| 5,971,884 A | * 10/1999 | Yoo | 475/298 |
| 6,039,671 A | * 3/2000 | Keller | 475/296 |
| 6,478,710 B1 | * 11/2002 | Steuer et al. | 475/289 |
| 6,558,288 B2 | * 5/2003 | Okochi | 475/297 |
| 6,572,508 B2 | * 6/2003 | Shoge | 475/324 |

FOREIGN PATENT DOCUMENTS

| | | | | |
|---|---|---|---|---|
| DE | 4229023 C | * 2/1995 | .......... B62M/11/16 |
| GB | 2128273 A | * 4/1984 | .......... F16D/41/30 |

* cited by examiner

*Primary Examiner*—Tisha D Lewis
(74) *Attorney, Agent, or Firm*—Milan Milosevic; Lisa Wunderlich

(57) ABSTRACT

A multi-speed gear hub shiftable under load having a hub shell, a stationary hub shaft, a bearing-mounted driver, and a planet gear mechanism having a ring gear and a planet carrier. A selector element displaces a coupler and introduces a shifting motion into the gearing system. The power travels from the driver to a pawl carrier having rotational play and then to the ring gear and the coupler via the pawls. To implement the backpedal brake, the pawls on the pawl carrier are controlled in a directionally dependent manner via a cam element that is joined nonrotatably to the driver. A spring-preloaded shifting sleeve disengages the pawls with a driving contour on the coupler which is initiated by the selector element. The ring gear carries stud-mounted displacement pawls and is split to simplify production and assembly. The braking operation is always performed in the low gear ratio and thus always exhibits the same braking effect regardless of the gear selection.

34 Claims, 4 Drawing Sheets

MULTI-SPEED GEAR HUB SHIFTABLE UNDER LOAD

BACKGROUND OF THE INVENTION

The present invention relates to multi-speed gear hub systems and more particular to an internal gear hub system shiftable under load for a bicycle.

Internal gear hub systems shiftable under load have devices which make it possible to disengage and engage gearing system elements that are currently in the power flow with little shifting force. This disengagement and engagement of gearing system elements, such as a ring gear, a planet carrier, driver, and clutch components, is preferably accomplished via controllable spring-loaded pawls.

Such a pawl control system is disclosed in DE 2937126 C2 for a two-speed gear hub. A preloaded pawl control member is displaced with relatively little shifting force against spring-loaded pawls by a selector element. The selector element is arranged in the axial direction and is displaceable by a selector rod between two end positions. The pawl control member hooks under the pawls and pivots them, even under load, out of a corresponding pawl tooth set, thereby interrupting the power flow.

Another pawl-controlled multi-speed hub shiftable under load is disclosed in DE 3443592 C2. The hub includes a planetary gear mechanism and a driver that carries a sprocket and is mounted on a hub shaft. The planetary gear mechanism includes a stationary sun gear, a planet carrier with a planet gears, and a ring gear. Four pawl freewheels are located in the power flow respectively between the driver and the ring gear, a selector element and the planet carrier, the ring gear and the hub shell, and the hub shell and a pawl carrier joined rotatably to the planet carrier. The pawls may be disengaged or engaged with corresponding pawl teeth, or overrun when the component having the pawl teeth is rotating faster than the component having the pawls.

To shift to a desired gear ratio, the selector element is slid into the desired ratio by a shift linkage via an axially displaceable actuation element, thus directing the power flow via the corresponding pawls. When the hub is in the high gear ratio, the power introduced into the driver from the sprocket is passed to the selector element and then to the selector element pawls to the planet carrier. The planet gears rotate the ring gear, and the ring gear pawls transfer the power to the hub shell connected to the driven wheel. In the high gear ratio, all the pawls are located opposite the corresponding pawl teeth, and the propulsion pawls and the pawls on the pawl carrier coupled nonrotatably to the planet carrier are overrun by their pawls teeth.

In order to engage the direct and low gear ratios, the actuation element is slid against the selector element. The rotation of the selector element is used to release the selector element pawls from engagement with the planet carrier, thereby greatly reducing the necessary shifting force. The power flow through the selector element is thus interrupted. In the direct gear ratio, the power flow travels from the driver via the driver pawl to the ring gear, and via the ring gear pawl to the hub shell. The pawls on the pawl carrier are overrun by their pawl teeth. In the low gear ratio, the ring gear pawl is additionally disengaged by a stop surface on the selector element, so that the power flow travels from the ring gear via the planet gears to the planet carrier and from there via the pawl carrier and the pawls to the hub shell.

The above mentioned multi-speed hub is shiftable under load but has several shortcomings. One problem is that in some shift positions, the spring-preloaded components with different rotation speeds rub against one another. Another problem is that shifting forces in the direction of the driver act, without a spring buffer, directly on the actuation element and the selector element, resulting in the gear ratio selection being more difficult under unfavorable shifting conditions and the gear ratio preselection is not possible. Another problem is the complex component configurations for the driver, the ring gear and the selector element, making production and assembly difficult.

SUMMARY OF INVENTION

An object of the present invention is to provide a multi-speed hub shiftable under load that eliminates the aforesaid shortcomings, ensures effective and ratio-independent braking performance, and moreover is easy to produce and assemble.

Specifically, there is to be no difference in rotational speed between the spring-loaded shifting components and the corresponding spring bracing. During unfavorable shifting situations it is desirable to have gear ratio preselection or temporary storage of the shifting force. The operation of switching over from propulsion mode to backpedal braking mode should occur with as little delay as possible, but with a desirable backlash. The braking operation should always occur in the low gear ratio. The configuration of the components are such that the sintered or molded plastic parts may be used, resulting in parts that are produced with as little reworking as possible and are easy to assemble.

The present invention provides these features by having a separate pawl carrier that receives a plurality of pawls directed outward and inward and arranged axially next to the driver, and also having a split ring gear for the receiving and supporting displaceable pawls. The pawl carrier sits on driving segments of the driver and the pawls are located on the periphery of the carrier. The pawls are engagable with the ring gear and are respectively oriented in a first rotational direction or a second rotational direction. The pawls are activated or deactivated by a cam element joined nonrotatably to the driver. The driving segments of the driver rotate the cam element about the hub shaft with zero-backlash. The pawl carrier is rotatable with respect to the driving segments, so that the corresponding spring-loaded pawls on the periphery of the pawl carrier are simultaneously engaged and disengaged by the cam element regardless of rotation direction. The cam element has several open spaces which form a cam profile which partially surrounds the pawls axially and, in the context of a relative rotation of the driver and the pawl carrier, bring about the radial motion of the spring-preloaded pawls.

The spring-preloaded pawls are also provided on the inside diameter of the pawl carrier. These pawls engage a coupler and are longer than a driving contour of the coupler. The pawls are engaged or disengaged via a control contour located on an axially displaceable shifting sleeve that is joined nonrotatably to the hub shaft.

During the shifting operation, the shifting motion of the selector element is transferred via a spacer bushing to the shifting sleeve that is axially preloaded by a spring. The spacer bushing is longer than the inside length of the spring-preloaded coupler. Such a configuration ensures that each shifting operation causes preloading of a spring, which does not execute a gear ratio change until a favorable shifting situation exists. As the selector element is displaced toward the planet gear, a displacement in the same direction of the preloaded shifting sleeve is thus already made possible, while the inwardly directed pawls on the pawl carrier are still engaged in the driving contour of the coupler. The preloaded shifting sleeve has a stop collar, a control contour, and a inclined collar that hold the pawls in the disengaged state. The stop collar diameter corresponds approximately to the root diameter of the driving contour of the coupler. The stop collar serves to pre-center the inwardly directed pawls on the pawl carrier. These pawls extend out beyond the driving teeth of the coupler, and which may result in the pawls being slightly tilted during nonuniform loading or an unfavorable tolerance situation. However, the tilting is compensated for by the pre-centering of the pawls which allows the control contour to hook under the pawls and disengage them from the driving contour on the coupler. The longer pawls allow for easier centering and hooking by the shifting sleeve. The unloaded coupler is then displaced by the shifting sleeve toward the planet gear.

The coupler is nonrotatably connected to the planet carrier for all gear ratios. When the pawls are engaged, power is transferred from the driver to the planet carrier. When the coupler is axially displacement, the pawls in the ring gear, configured as displacement pawls, may be disengaged from the driving contour of the hub shell by a stop surface. The displacement pawls may be mounted by studs in elongated holes on the ring gear, and are preloaded by springs. The ring gear may form two parts. The parts have corresponding facing surfaces being matched to one another to ensure a radial and nonrotatable joint. The two part configuration also facilitates assembly of the stud-mounted displacement pawls and allows the ring gear to be manufactured as a molded part, e.g. sintered part or cold-formed part. The spring-preloaded displacement pawls that couple the ring gear and the hub shell are used to counteract gearing system distortion after a backpedal braking operation. The distortion may occur if the nondisplaceable ring gear pawls and locking pawls located in the power flow between the planet carrier and hub shell are simultaneously engaged in driving contours of the hub shell.

The configuration of the separate pawl carrier, control sleeve, coupler, ring gear, and cam element provides a cost efficient manufacturing, without reworking, of these components as molded parts, e.g. as sintered, forged, cold-formed or molded plastic parts. The configuration also simplifies the assembly of the subassemblies and the hub gearing system.

In the present invention, gear selection of the hub is accomplished exclusively by engaging and disengaging pawls. When the hub is in the low gear ratio, the power flows from the driver via the driving segments to the pawl carrier, via propulsion pawls on the periphery to the ring gear, via planet gears to the planet carrier and from there via pawls to the hub shell. In the low gear position, the pawls between the pawl carrier and the coupler and between the ring gear and the hub shell are disengaged.

When the hub is in the direct gear ratio, the power flows from the driver via the driving segments to the pawl carrier, via propulsion pawls to the ring gear and from there via pawls to the hub shell. In the direct gear ratio, the pawls from the planet carrier to the hub shell and the pawls from the pawl carrier to the ring gear are overrun.

The backpedal brake of the multi-speed hub always operates in the low gear ratio. As the driver is rotated backward, the rotational play between the driving segment and the pawl carrier is taken up, and at the same time the propulsion pawls are disengaged from the cam element and the brake pawls are engaged. The backward rotational motion is transferred from the brake pawls to the ring gear, and then via the planet gears to the planet carrier. The braking motion is then converted into an axial motion by a brake cone or, in the other braking apparatuses, for example into a radial motion by ramp segments and rollers. During the braking operation, the pawls acting on the hub shell and on the coupler are overrun by the corresponding driving contours.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

Figure 1:
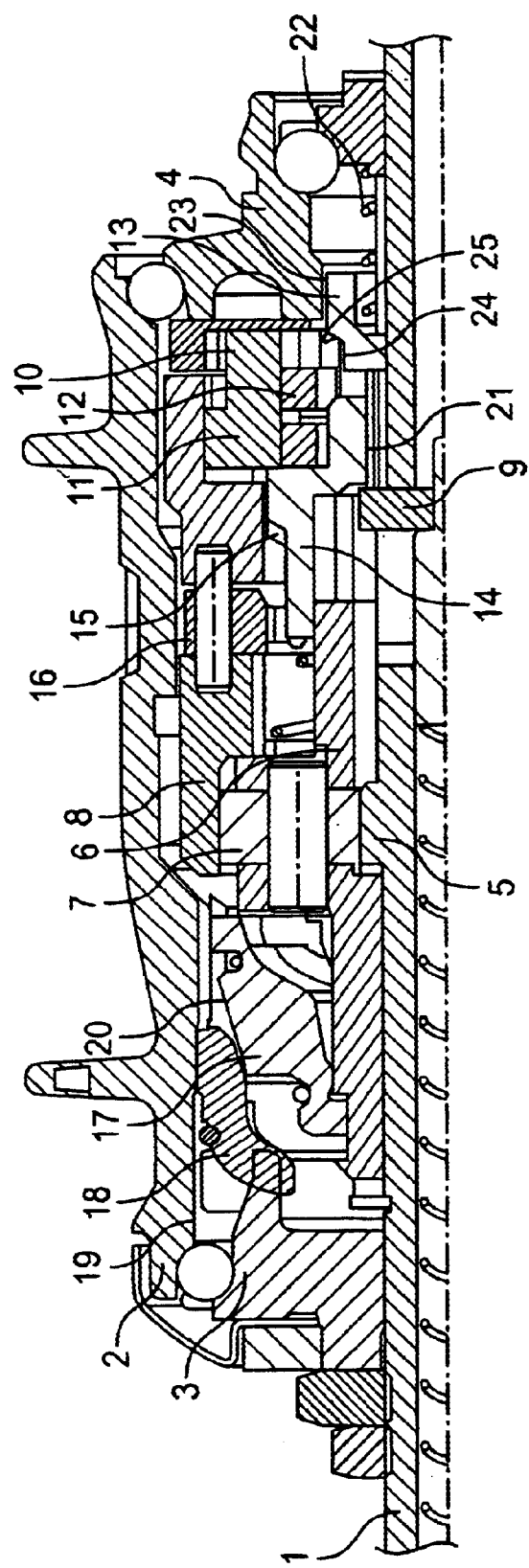
FIG. 1 is a cross-sectional view of an internal gear hub in accordance with the present invention.

FIG. 1 illustrates a cross section of an internal gear hub shiftable under load having a separate pawl carrier in accordance with one embodiment of the present invention. This particular hub has a low gear with a reduction ratio, a direct gear in which the driver and hub shell rotation speeds are identical, and a high gear with a corresponding step-up ratio. The hub includes a hub shaft 1 that is attached at both ends to a bicycle frame (not shown). A hub shell 2 is supported by rolling bearings on a fixed bearing plate 3 and on a driver 4 (also bearing-mounted). Located between the driver 4 and the hub shell 2 is a planet gear mechanism including a shaft-mounted sun gear 5, a planet carrier 6, planet gears 7, and a ring gear 8. A spring-coupled selector element 9 selects the various gear ratios by engaging and disengaging pawls Driver 4, driven by a chain wheel, has two driving segments. One driving segment nonrotatably receives a cam element 10 and the other driving element receives and carries a pawl carrier 11 with rotational play.

Propulsion pawls and brake pawls are arranged on the periphery of the pawl carrier 11 and are spring-loaded. The cam element 10 drives the propulsion pawls and brake pawls into engagement with the driving contour on the ring gear 8. Attached on the inside diameter of the pawl carrier 11 are spring-loaded transfer pawls 12 that are engaged and disengaged from the driving contour on coupler 14 by a spring-preloaded shifting sleeve 13. The spring-preloaded coupler 14 is joined axially displaceably but always nonrotatably to planet carrier 6, and when the coupler 14 is engaged it transfers power to the planet carrier 6. Coupler 14 has a stop contour 15 that disengages the ring gear pawls 16 from the corresponding driving contour on hub shell 2. Planet carrier 6 has, on the bearing plate side 3, a helical thread that axially displaces a brake cone 17 during a backpedal braking operation. The axial displacement of the brake cone 17 results in a brake casing 18 and a further cone on the bearing plate 3 to press against a brake cylinder 19. The brake cone 17 has spring-loaded locking pawls 30 on its periphery that are always engaged with the corresponding driving contour on the hub shell or are overrun by the driving contour.

To engage the low gear ratio, the selector element 9 is displaced toward the sun gear 5, however this cannot occur until the force of the spring applied to the selector element 9 is less than the preload force on shifting sleeve 13. The shifter sleeve 13 displaces coupler 14 and spacer bushing 21 and then the selector element 9 toward the sun gear 5. The stop contour 15 on the coupler 14 moves under the ring gear pawls 16 and disengages them out of the driving contour on the hub shell 2. The power flow travels from the driver 4 via the propulsion pawls of the pawl carrier 11 to the ring gear 8, via planet gears 7 to the planet carrier 6, then to the brake cone 17, and finally via the locking pawls 20 to the hub shell 2. If the gearing system is not ready for the shifting operation, the shifting work is briefly stored in the shifting sleeve spring 22 until a favorable shifting situation is once again established.

To engage the direct gear, the selector element 9 is slid toward the driver 4, so that the space bushing 21 displaces the shifting sleeve 13 against the prevailing spring force. The spring-preloaded coupler 14 follows the retreating shifting sleeve 13 and thereby allows ring gear pawls 16 to pivot into the driving contour on the hub shell 2. The power flow goes from driver 4 via the propulsion pawls of the pawl carrier 11 to the ring gear 8, and via the ring gear pawls 16 to the hub shell 2, locking pawls 20 being overrun by the corresponding driving contour on the hub shell 2. If the gearing system is not ready for the shifting operation, the shifting work is briefly stored in the spring in the front of the selector element 9 until a favorable shifting situation is once again established.

When the high gear is selected, the selector element 9 is slid farther toward driver 4, so that the spacer bushing 21 displaces shifting sleeve 13 against the prevailing spring force. The inclined collar 23 disengages the transfer pawls 12 and then the pawls 12 pivot to engage the driving contour of coupler 14. The power flow travels from the driver 4 via the transfer pawls 12 of the pawl carrier 11 to the coupler 14, and then via planet carrier 6 and the planet gears 7 to the ring gear 8 and finally through the ring gear pawls 16 to the hub shell 2. During this shift position, the locking pawls 20 are overrun by the corresponding driving contour on the hub shell 2. If the gearing system is not ready for the shifting operation, the shifting work is briefly stored in the spring in the front of the selector element 9 until a favorable shifting situation is once again established.

When a downshift occurs from the high gear ratio to the direct gear ratio, the tension of the spring in the front of the selector element 9 is lowered. The preloaded shifting sleeve spring 22 acts on the shifting sleeve 13, displacing it and the coupler 14, as well as the spacer 21, resulting in the selector element 9 moving toward the sun gear 5. In the process, the stop collar 24 of the shifting sleeve 13 travels beneath the transfer pawls 12 and brings about, if the pawls are not exactly positioned, a pre-centering of the transfer pawls 12 before they are disengaged from the control contour 25 and held by the inclined collar 23 in the disengaged state. If the gearing system is not ready for the shifting operation into the direct gear, the shifting work is briefly stored in the shifting sleeve spring until a favorable shifting situation is once against established.

The backpedal braking operation is always performed in the low gear ratio and is initiated by a backward rotary motion on the driver. The driver 4 then rotates with respect to the pawl carrier 11. To receive the driving segments of the driver 4, corresponding recesses are provided on the pawl carrier 11 to provide rotational play for engagement and disengagement of the drive and brake pawls by the cam element 10. As the driver 4 is rotated backward, the cam element 10 that sits nonrotatably on the driver is rotated with respect to the pawl carrier 11. The propulsion pawls and the brake pawls are simultaneously changed over by corresponding cam profiles in cam element 10, which partially surrounds the pawls. The brake pawls engage the driving contour, acting on both sides, of the ring gear 8. Then the backward motion is transferred to the planet gears 7 and thus to the planet carrier 6. As a result of the backward rotation of the planet carrier 6, the brake cone 17 is moved by the helical thread on the planet carrier 6 axially toward bearing plate 3. The brake casing 18, which is braced on a bevel on the brake cone 17 and against the bearing plate 3, is thereby pressed against the brake cylinder 19. During the braking operation, the pawls engaging the driving contour on the hub shell and on the coupler are disengaged or are overrun by the corresponding driving contours.

A benefit of this internal gear hub system over previous hub systems is that it reduces internal friction. This is accomplished by providing the axially acting springs and the spring-loaded components necessary for the shifting function that are not braced against the adjacent components rotating with relative rotational speeds. In particular, the spring-loaded selector element 9, the spacer bushing 21, the shifting sleeve 13, and the shifting sleeve spring 22 are nonrotatable and cause no axial friction losses. The displacement spring acting between the planet carrier 6 and the coupler 14 also causes no axial friction losses, since these components are always joined nonrotatably to one another.

Figure 2:
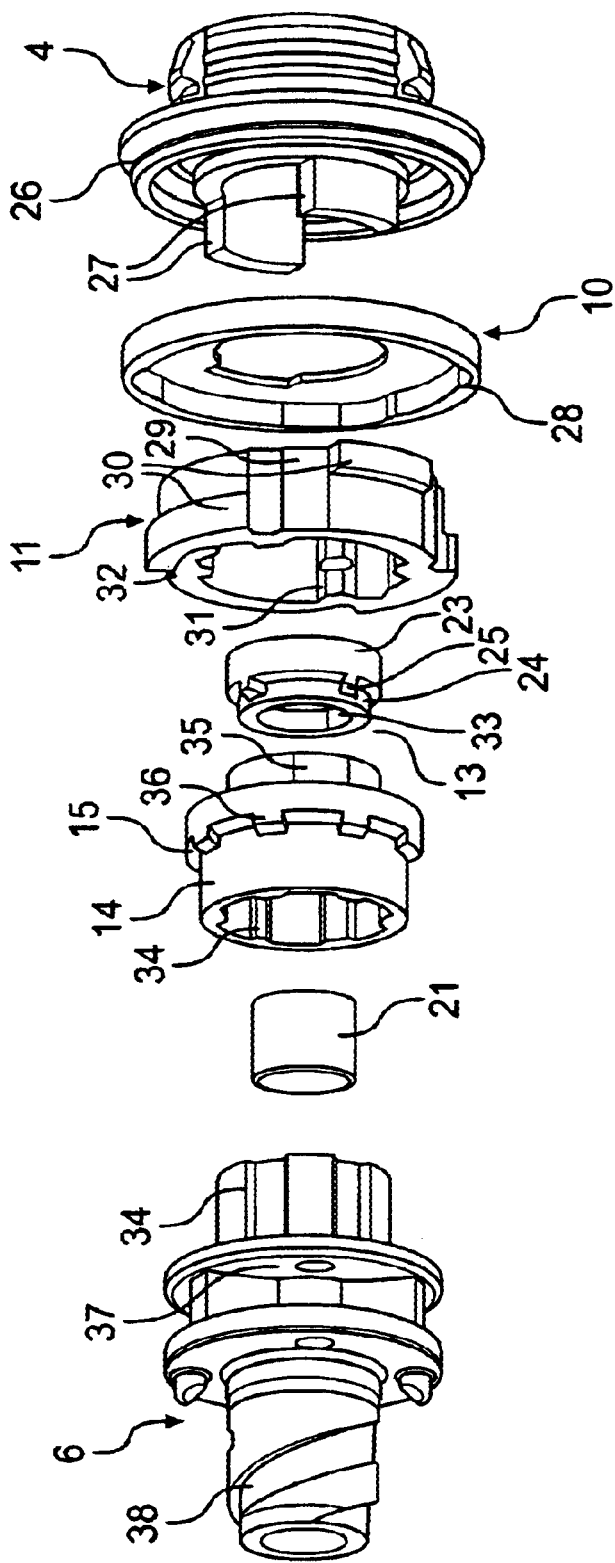
FIG. 2 is an exploded view of the internal gear hub of FIG. 1.

Referring now to FIG. 2, driver 4 at one end of the hub shaft receives the sprocket and has a raceway 26 for the rolling elements. Located at the other end are driving segments 27 that engage into and nonrotatably receive corresponding contours on the cam element 10.

The cam element 10 may be a molded plastic part and has cam profiles 28 that partially surround on the one hand the propulsion pawls and on the other hand the brake pawls, and when a relative motion exists between the driver 4 and the pawl carrier 11 the pawls are simultaneously engaged or disengaged depending on the rotation direction.

Pawl carrier 11 may be configured as a sintered part that can be assembled without material-removing machining. Pawl receptacles 29 for the oppositely oriented propulsion and brake pawls are provided on the periphery. These pawls may be preloaded by a helical spring that is braced, as an alternative to a continuously extending groove, by offset guide elements 30. Provided on the inside diameter of the pawl carrier 11 in various peripheral segments having recesses with rotational stops 31 to receive driving segments 27 that alternate with receiving troughs 32 for the transfer pawls acting in the direction of the coupler 14. The transfer pawls are spring-loaded and axially immobilized by a snap ring, since the snap ring may be braced against corresponding guide edges (not shown).

The shifting sleeve 13 may be a sintered part and is guided nonrotatably on the hub shaft by a longitudinal guide 33. The stop collar 24 performs any pre-centering of the transfer pawls that may be necessary before they are disengaged by a cam-shaped control contour 25 and are then held in the that position by the stop collar 23. The shifting sleeve 13 is preloaded by the shifting sleeve spring in the direction of the planet carrier 6, and is axially displaced by the selector element by the spacer bushing 21.

Coupler 14 may also be configured as a sintered part and is always nonrotatably joined to planet carrier 6 by coupling splines 34. In the engaged state, the transfer pawls are in contact against driving teeth 35. Similarly to the shifting sleeve, there is provided on the periphery of a disengagement cam 36, a stop contour 15 that, upon corresponding displacement of coupler 14, hooks under the ring gear pawls and disengages them.

Planet carrier 6 rotates around the hub shaft 6 and constitutes, at one end of a planet gear guide 37, the mating element to coupling splines 34. Located at the other end is a seat for brake cone 17, with helical thread 38 for axial displacement of brake cone 17 during the backward motion of driver 4.

Figure 3:
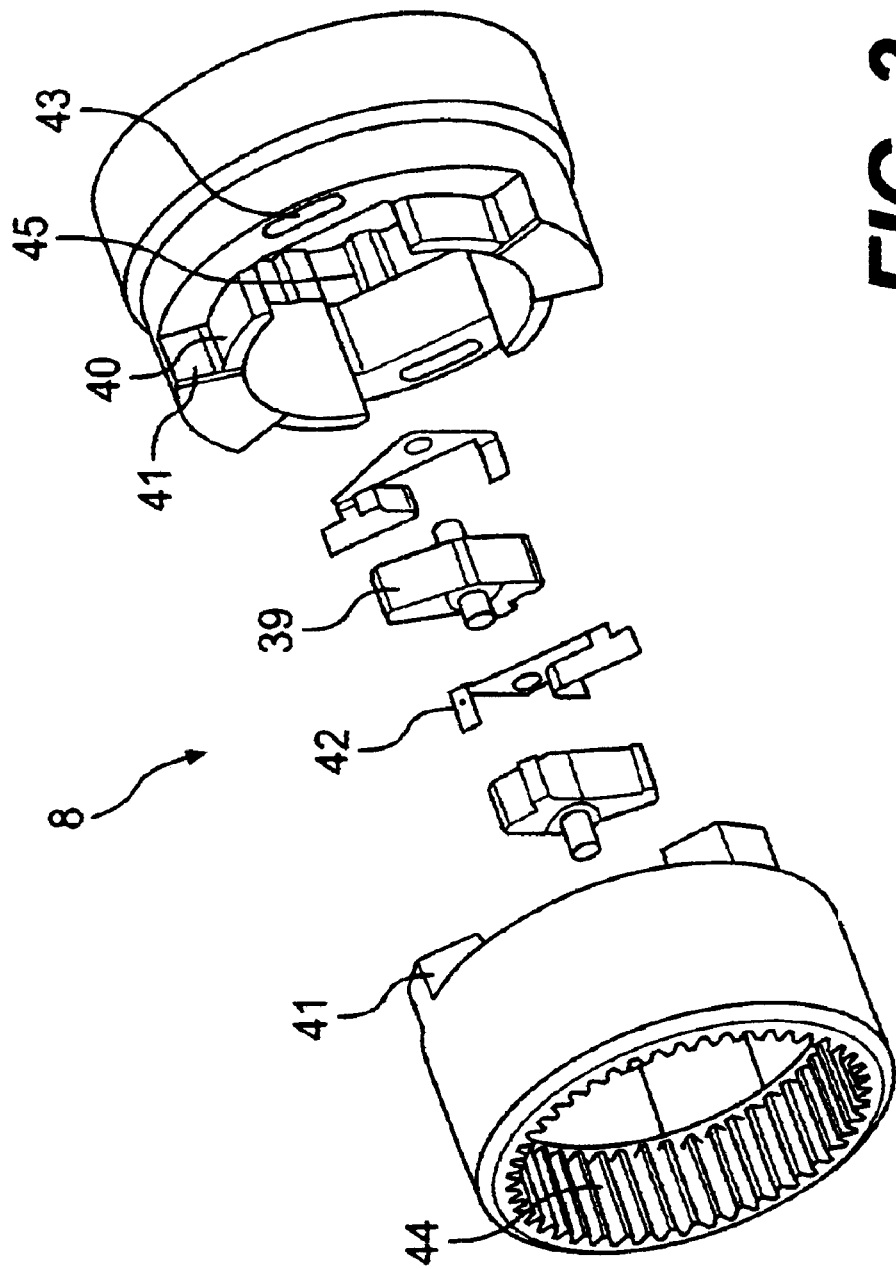
FIG. 3 is an exploded view of a ring gear and ring gear pawls of FIG. 1.

FIG. 3 shows an exploded drawing of ring gear 8, with the ring gear pawls that are configured as stud-mounted displacement pawls 39. The ring gear may be configured as a sintered part and includes two net-shape halves that are fitted together with zero backlash, without material-removing machining, after insertion of the displacement pawls. The ring gear halves are matched to one another in such a way that they brace against each other by radial guides 40 and rotational stops 41. The ring gear halves are not axially immobilized with respect to one another, and in the assembled state are immobilized by the planet carrier and the cam element. Displacement pawls 39 are preloaded by sheet-metal springs 42 that brace against the ring gear halves, and are mounted at their studs in oppositely located elongated holes 43. The one ring gear half has internal splines 44 that coact with the planet gears, while driving contour 45 for the propulsion and brake pawls is arranged in the other ring gear half.

Figure 4:
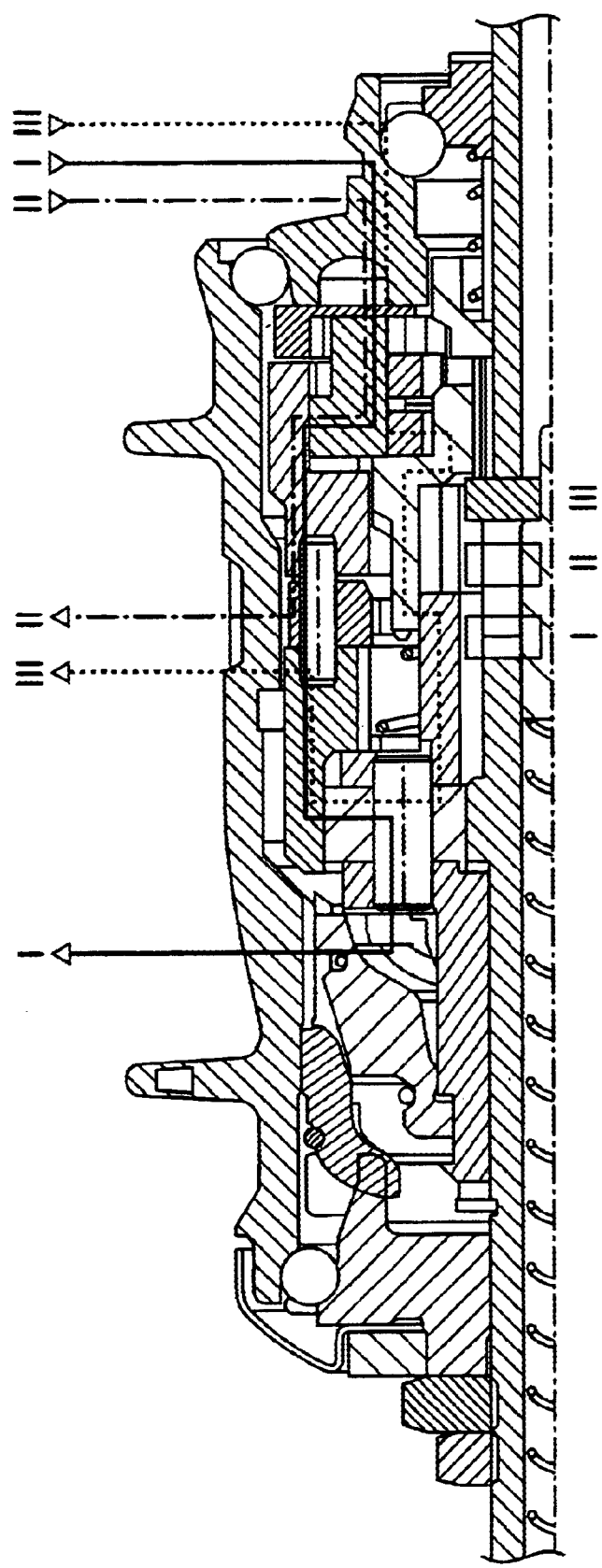
FIG. 4 is a cross-sectional view of the internal gear hub showing the power flow during various gear ratios.

FIG. 4 shows the power flow in the various gear ratios of the on-load-shiftable hub gearing system. The power flow for the low gear is labeled I and is depicted with a solid line. The selector element is in the left position, also labeled 1. In this gearing system position, the driver rotation speed is stepped down, and the hub shell thus rotates more slowly than the driver being driven by the sprocket.

The power flow in the direct gear is labeled 11, and is depicted with a dot-dash line. The selector element is in the middle position, also labeled II. In this gearing system position the drive rotation speed is transmitted at a 1:1 ratio to the hub shell.

In the high gear, the drive rotation speed is stepped up: the hub shell rotates more quickly than the driver. The power flow is labeled III and is depicted with a dashed line. The selector element is in the right position and is also labeled III.

While the invention has been described by reference to a certain preferred embodiment, it should be understood that numerous changes could be made within the spirit and scope of the inventive concepts described. Accordingly, it is intended that the invention not be limited to the disclosed embodiment, but that it have the full scope permitted by the language of the following claims.

What is claimed is:

1. A multi-speed hub shiftable under load for a bicycle, said multi-speed hub comprising:
    a hub shell;
    a stationary hub shaft;
    a selector element;
    a bearing-mounted driver;
    a planetary gear mechanism having a planet carrier, a plurality of planet gears and a ring gear;
    a coupler located between the driver and the planet carrier;
    a pawl carrier separate from the driver;
    a first pawl arranged on the pawl carrier and engageable with the coupler; and
    a second pawl arranged on the pawl carrier and engageable with the ring gear, the first and second pawls configured to pass the power flow to the ring gear and the coupler.

2. The multi-speed hub as defined in claim 1 wherein the driver and the pawl carrier are connected by at least one driving segment to allow rotational play therebetween.

3. The multi-speed hub as defined as claim 2 wherein the pawl carrier is mounted on at least two driving segments of the driver that project axially into the pawl carrier, the pawl carrier movable in first and second rotational directions, rotational play is provided between the driving segments and rotational stops in the pawl carrier.

4. The multi-speed hub as defined in claim 1 wherein the plurality of pawls for coupling the pawl carrier and the ring gear are arranged on a periphery of the pawl carrier and the plurality of pawls for coupling the pawl carrier and the coupler are arranged on an inside diameter of the pawl carrier.

5. The multi-speed hub as defined in claim 4 wherein the pawls on the pawl carrier are biased away from the pawl carrier by a spring element.

6. The multi-speed hub as defined in claim 1 wherein the pawls for coupling the pawl carrier and the ring gear are engaged and disengaged from a driving contour of the ring gear, depending on the rotational direction, by a cam element connected nonrotatably to the driver and a correspondingly arranged spring element.

7. The multi-speed hub as defined in claim 6 wherein the cam element and the driver rotates relative to the pawl carrier, be pawls pivot radially outward into an open space in one rotational direction and pivot to a radial cam on the cam element in the other rotational direction, the pawls pressed radially inward by the radial cam when the cam element rotates further.

8. The multi-speed hub as defined in claim 6 wherein the cam element has a contour for coupling the pawls radially inward and outward, the contour partially axially surrounds the pawls on the periphery.

9. The multi-speed hub as defined in claim 6 wherein the cam element is a molded part made of a dimensionally stable and heat-resistant material and is arranged between the driver and the pawl carrier.

10. The multi-speed hub as defined in claim 6 wherein at least one pawl on the pawl carrier, upon forward rotation, comes into engagement under the control of the cam element and at least one pawl, becomes functional upon backward rotation, the engagement and disengagement operation occurring simultaneously.

11. The multi-speed hub as defined in claim 1 wherein the pawl carrier is one of a sintered part and cold-formed part.

12. The multi-speed hub as defined in claim 11 wherein the pawl carrier has axially and radially offset guide elements on a periphery of the pawl carrier to ensure axial immoblization of spring elements biasing the pawls.

13. The multi-speed hub as defined in claim 1 wherein the pawls for coupling the pawl carrier and the coupler are longer than driving teeth on the coupler, the pawls disengaged from the driving teeth of the coupler by an axially displaceable shifting sleeve connected nonrotatably to the hub shaft.

14. The multi-speed hub shiftable under load for a bicycle, the multi-speed hub comprising:
- a hub shell;
- a stationary hub shaft;
- a selector element;
- a bearing-mounted driver;
- a planetary gear mechanism having a planet carrier, a plurality of planet gears and a ring gear;
- a coupler arranged between the driver and the planet carrier;
- a plurality of pawls for transferring power in different gear ratios;
- a spacer bushing located between a shifting sleeve and the selector element for transferring motion between the selector element and the shifting sleeve, the shifting sleeve preloaded in a direction of the selector element by a spring element.

15. The multi-speed hub as defined in claim 14 wherein an axial spacing of the shifting sleeve from the selector element is provided by the spacer bushing and a length of the spacer bushing is greater than a length of an oppositely located inside surface of the coupler.

16. The multi-speed hub as defined in claim 14 wherein the spacer bushing is configured such that upon a movement of the selector element in the direction of the planet gear, the spacer bushing displaces the preloaded shifting sleeve in the same direction while inwardly directed pawls on a pawl carrier are engaged into the driving teeth of the coupler.

17. The multi-speed hub as defined in claim 14 wherein the shifting sleeve has a control contour configured such that upon an axial displacement of the shifting sleeve to disengage the pawls from driving teeth on the coupler, the coupler is displaced by the shifting sleeve in the direction of the planet gear.

18. The multi-speed hub as defined in claim 17 wherein the shifting sleeve has a stop collar having a diameter corresponding to a root diameter of the driving teeth on the coupler to ensure pre-centering of the pawls.

19. The multi-speed hub as defined in claim 18 wherein the stop collar of the shifting sleeve has a conical profile, an initial diameter of the conical profile being slightly smaller and a final diameter of the profile being slightly larger than the root diameter of the driving teeth on the coupler.

20. The multi-speed hub as defined in claim 14 wherein the shifting sleeve includes cams having a control contour for disengaging the pawls and the shifting sleeve is one of a sintered part and a cold-formed part.

21. The multi-speed hub as defined in claim 14 wherein the coupler includes a stop contour for disengaging ring gear pawls mounted in the ring gear from a contour of the hub shell upon further movement of the selector element in the direction of the planet gear.

22. The multi-speed hub as defined in claim 1 wherein the coupler is driveable from the driver via at least one pawl on the pawl carrier that engages a driving tooth on the coupler, the coupler joined nonrotatably but axially displaceable from the planet carrier.

23. The multi-speed hub as defined in claim 22 wherein the coupler has a stop contour on a periphery of the coupler, the stop contour, upon displacement of the coupler in the direction of the planet gear, disengages ring gear pawls mounted in the ring gear from a contour of the hub shell.

24. The multi-speed hub as defined in claim 22 wherein the coupler is one of sintered part and cold-fanned part.

25. The multi-speed hub shiftable under load for a bicycle, the multi-speed hub comprising:
- a hub shell;
- a stationary hub shaft;
- a selector element;
- a bearing-mounted driver,
- a planet gear mechanism having a planet carrier, a plurality of planet gears and a ring gear;
- a coupler arranged between the driver and the planet carrier; and
- a plurality of pawls for transferring power in different gear ratios;
- the ring gear having ring gear pawls for coupling with the hub shell, the ring gear split into two parts in the region of the ring gear pawls, the ring gear parts having complimentary contours to provide a nonrotatable connection therebetween.

26. The multi-speed hub as defined in claim 25 wherein the ring gear pawls are mounted to the ring gear by studs extending through elongated holes an the ring gear to counteract any gearing system distortion after a backpedal braking operation.

27. The multi-speed hub as defined in claim 25 each of the ring gear pawls are biased outward by at least one spring braced against the ring gear.

28. The multi-speed hub as defined in claim 25 wherein at ends of the ring gear parts is a corresponding radial guide and a rotational stop to ensure a radial and nonrotatably connection between the ring gear parts.

29. The multi-speed hub as defined in claim 28 wherein as assembled within the multi-speed hub, the ring gear parts are axially immobilized by contiguous components of the multi-speed hub, the ring gear parts are one of sintered parts and cold-formed parts.

30. The multi-speed hub as defined in claim 25 wherein the hub is in a low gear ratio the power flows from the driver via drive pawls to the ring gear, from there via the planet gears to the planet carrier and via locking pawls on a brake cone driven by the planet carrier to the hub shell, the transfer pawls to the coupler and the ring gear pawls from the ring gear to the hub shell being disengaged.

31. The multi-speed hub as defined in claim 25 wherein when the hub is in a direct gear ratio the power flows from the driver via drive pawls to the ring gear and from there via the ring gear pawls to the hub shell, the transfer pawls to the coupler being disengaged, and locking pawls from a brake cone to the hub shell being overrun.

32. The multi-speed hub as defined in claim 25 wherein when the hub is in a high gear ratio the power flows from the driver via the transfer pawls to the coupler, then to the planet carrier and via the planet gears to the ring gear and via the ring gear pawls to the hub shell, locking pawls on a brake cone being overrun by a corresponding contour in the hub shell, and drive pawls on a pawl carrier being overrun by a driving contour on the ring gear.

33. The multi-speed hub as defined in claim 6 wherein a backpedal brake always operates in a low gear ratio and is activated via simultaneously engaged and disengaged pawls on the pawl carrier, brake pawls being brought into engagement on the driving contour on the ring gear by backward rotation of the driver and after takeup of a rotational play between the driver and the pawl carrier by a cam profile on the cam element.

34. The multi-speed hub as defined in claim 33 wherein the backward rotation introduced into the ring gear upon a backpedal braking operation is transferred via the planet gears to the planet carrier and then to a brake cone to be converted into a braking motion, and during the braking operation the ring gear pawls engaging the hub shell and transfer pawls engaging the coupler are one of disengaged and overrun by the corresponding driving contours.

* * * * *